(12) United States Patent
Uedaira (10) Patent No.: US 11,011,039 B2
(45) Date of Patent: May 18, 2021

(54) ULTRAVIOLET DETECTOR AND FIRE ALARM

(71) Applicant: Rohm Co., Ltd., Kyoto (JP)

(72) Inventor: Yoshitsugu Uedaira, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 16/564,911

(22) Filed: Sep. 9, 2019

(65) Prior Publication Data

US 2020/0082693 A1 Mar. 12, 2020

(30) Foreign Application Priority Data

Sep. 11, 2018 (JP) .............................. JP2018-169776

(51) Int. Cl.
| | | |
|---|---|---|
| *G08B 17/12* | (2006.01) | |
| *G08B 7/06* | (2006.01) | |
| *G01J 1/42* | (2006.01) | |
| *G01J 1/04* | (2006.01) | |
| *G01J 1/58* | (2006.01) | |

(52) U.S. Cl.
CPC ............ *G08B 17/12* (2013.01); *G01J 1/0492* (2013.01); *G01J 1/429* (2013.01); *G01J 1/4228* (2013.01); *G01J 1/58* (2013.01); *G08B 7/06* (2013.01)

(58) Field of Classification Search
CPC .. G08B 17/12; G08B 7/06; G01J 1/429; G01J 1/0492; G01J 1/58; G01J 1/4228; G01J 1/0219; G01J 1/0209; G01J 5/0014; G01J 5/022; G01J 5/025; G01J 5/045; G01J 5/0846; G01J 5/0862; G01J 1/50; G01N 21/64; G01N 21/6497; G01N 21/33; G01N 2021/6421
See application file for complete search history.

(56) References Cited

U.S. PATENT DOCUMENTS

| | | | | | |
|---|---|---|---|---|---|
| 4,065,672 | A | * | 12/1977 | Harpster ................... | G01J 1/46 250/372 |
| 5,339,070 | A | * | 8/1994 | Yalowitz ................. | F23N 5/082 340/578 |
| 5,581,090 | A | * | 12/1996 | Goudjil ..................... | G01J 1/50 250/372 |
| 5,671,914 | A | * | 9/1997 | Kalkhoran ........ | H01L 27/14645 257/437 |
| 6,013,919 | A | * | 1/2000 | Schneider ............... | F23N 5/082 250/554 |
| 6,335,529 | B1 | * | 1/2002 | Sekii ......................... | G01J 1/58 250/372 |
| 7,541,938 | B1 | * | 6/2009 | Engelhaupt ............ | G08B 17/12 250/339.13 |

(Continued)

FOREIGN PATENT DOCUMENTS

| JP | 2011-151269 | | 8/2011 | | |
|---|---|---|---|---|---|
| WO | WO-2005045379 | A1 * | 5/2005 | ............. | F23N 5/082 |

*Primary Examiner* — Adnan Aziz
(74) *Attorney, Agent, or Firm* — Fish & Richardson P.C.

(57) ABSTRACT

According to one embodiment of the present disclosure, there is provided an ultraviolet detector, including: an ultraviolet ray transmitting part configured to transmit ultraviolet ray contained in incident light; a wavelength conversion part configured to convert the ultraviolet ray transmitted through the ultraviolet ray transmitting part into visible light; and a visible light receiving part configured to detect the visible light obtained by the wavelength conversion part.

9 Claims, 6 Drawing Sheets

(56) References Cited

U.S. PATENT DOCUMENTS

| | | | |
|---|---|---|---|
| 9,200,957 B2* | 12/2015 | Berezhnyy | G01J 1/0403 |
| 9,666,048 B2* | 5/2017 | Fischer | G01N 21/49 |
| 2001/0009268 A1* | 7/2001 | Brown | G01J 5/602 |
| | | | 250/339.15 |
| 2002/0096728 A1* | 7/2002 | Kuhlmann | G01J 1/429 |
| | | | 257/432 |
| 2003/0080294 A1* | 5/2003 | Matocha | G01J 5/602 |
| | | | 250/339.15 |
| 2003/0150998 A1* | 8/2003 | Shin | G01J 1/429 |
| | | | 250/372 |
| 2003/0234365 A1* | 12/2003 | Wipenmyr | G01J 1/429 |
| | | | 250/372 |
| 2007/0008539 A1* | 1/2007 | Hirano | G02B 5/284 |
| | | | 356/432 |
| 2009/0060260 A1* | 3/2009 | Hou | G08B 17/12 |
| | | | 382/100 |
| 2010/0330516 A1* | 12/2010 | Haffner | F23N 5/082 |
| | | | 431/75 |
| 2011/0181765 A1* | 7/2011 | Nakahara | H01L 27/14643 |
| | | | 348/308 |
| 2012/0074848 A1* | 3/2012 | Zhu | H05B 41/2813 |
| | | | 315/134 |
| 2014/0061486 A1* | 3/2014 | Bao | G02B 1/02 |
| | | | 250/370.01 |
| 2015/0338273 A1* | 11/2015 | Emadi | H01L 31/02162 |
| | | | 250/372 |
| 2016/0313176 A1* | 10/2016 | Lee | A61B 5/681 |
| 2017/0314989 A1* | 11/2017 | Mazzillo | G01J 1/429 |
| 2018/0172506 A1* | 6/2018 | Park | H01L 31/108 |
| 2018/0322753 A1* | 11/2018 | Stibich | G08B 17/107 |

* cited by examiner

| UV luminescent ink | UVB | UVC | D90 particle diameter [μm] |
|---|---|---|---|
| X | Orange (590~620nm) | Green (495~570nm) | ≦3 |
| Y | Red (620~750nm) | Green (495~570nm) | ≦5 |
| Z | Blue (450~495nm) | Green (495~570nm) | ≦2 |

ULTRAVIOLET DETECTOR AND FIRE ALARM

CROSS-REFERENCE TO RELATED APPLICATION(S)

This application is based upon and claims the benefit of priority from Japanese Patent Application No. 2018-169776, filed on Sep. 11, 2018, the entire contents of which are incorporated herein by reference.

TECHNICAL FIELD

The present disclosure relates to an ultraviolet detector and a fire alarm.

BACKGROUND

Recently, ultraviolet (UV) detectors have been used in various applications (such as flame sensors of fire alarms).

Meanwhile, silicon-based light receiving elements (=photodiodes, phototransistors, or the like integrated on a silicon substrate) widely used as a detection means for visible light or infrared ray generally lack light receiving sensitivity in a UV region (especially, a UVB region or a UVC region).

Therefore, in the conventional UV detectors, a zinc oxide-based or gallium nitride-based light receiving element having excellent light receiving sensitivity in the UV region has been used.

SUMMARY

Some embodiments of the present disclosure provide a UV detector capable of using a silicon-based light receiving element in view of the above-mentioned problems found by the inventor of the present disclosure.

An ultraviolet detector disclosed in the present disclosure, includes: an ultraviolet ray transmitting part configured to transmit ultraviolet ray contained in incident light; a wavelength conversion part configured to convert the ultraviolet ray transmitted through the ultraviolet ray transmitting part into visible light; and a visible light receiving part configured to detect the visible light obtained by the wavelength conversion part (first configuration).

In the ultraviolet detector of the first configuration, the visible light receiving part includes a silicon-based light receiving element (second configuration).

In the ultraviolet detector of the first or second configuration, the wavelength conversion part is configured to convert ultraviolet ray in a UVB region into visible light of a first wavelength, and to convert ultraviolet ray in a UVC region into visible light of a second wavelength that is different from the first wavelength (third configuration).

In the ultraviolet detector of the third configuration, the visible light receiving part includes: a first light receiving element configured to detect the visible light of the first wavelength; and a second light receiving element configured to detect the visible light of the second wavelength (fourth configuration).

The ultraviolet detector of the fourth configuration, further includes a light shielding wall forming a light guide path of each of the first light receiving element and the second light receiving element (fifth configuration).

In the ultraviolet detector of any one of the first to fifth configurations, the ultraviolet ray transmitting part includes: a UVB transmission filter configured to transmit ultraviolet ray in a UVB region; and a UVC transmission filter configured to transmit ultraviolet ray in a UVC region (sixth configuration).

In the ultraviolet detector of any one of the first to sixth configurations, the wavelength conversion part contains a fluorescent pigment for emitting the visible light by receiving the ultraviolet ray (seventh configuration).

The ultraviolet detector of any one of the first to seventh configurations, further includes an infrared shielding part configured to shield infrared ray between the wavelength conversion part and the visible light receiving part (eighth configuration).

The ultraviolet detector of any one of the first to eighth configurations, further includes: an infrared ray transmitting part configured to transmit infrared ray contained in the incident light; and an infrared ray receiving part configured to detect the infrared ray transmitted through the infrared ray transmitting part (ninth configuration).

A fire alarm disclosed in the present disclosure, includes: a flame sensor configured to detect ultraviolet ray emitted by a flame using the ultraviolet detector of any one of the first to ninth configurations; an alarm output part configured to output an alarm; and a controller configured to drive the alarm output part according to a detection result of the flame sensor (tenth configuration).

In the fire alarm of the tenth configuration, the ultraviolet detector is configured to calculate values corresponding to respective irradiances of ultraviolet ray of both UVB region and UVC region, and to determine a type of the flame from respective intensities and ratios of the ultraviolet ray (eleventh configuration).

DETAILED DESCRIPTION

Embodiments of the present disclosure will be now described in detail with reference to the drawings.

<Ultraviolet (UV) Detector (First Embodiment)>

Figure 1:
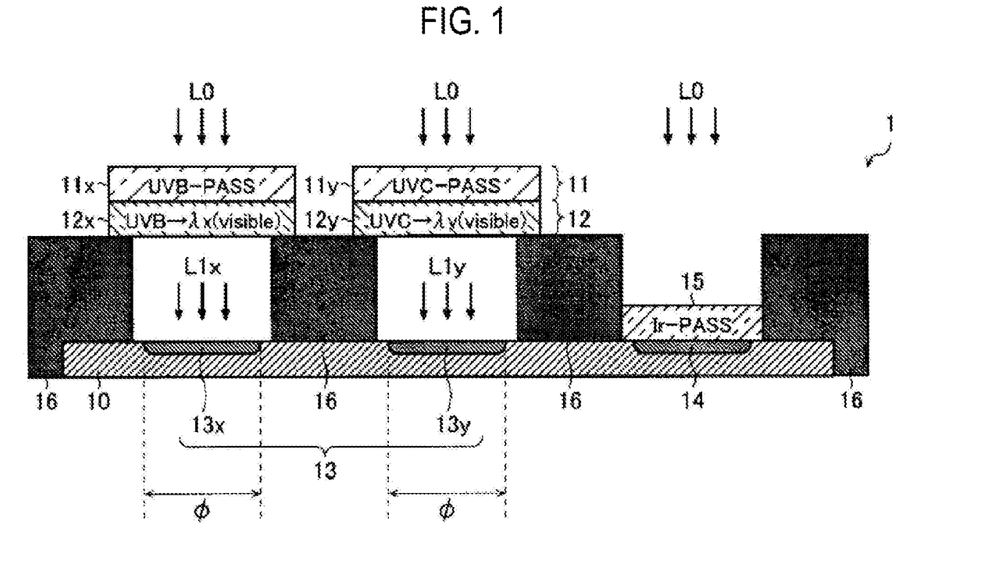
FIG. 1 is a view illustrating a first embodiment of a UV detector.

FIG. 1 is a vertical cross-sectional view schematically illustrating a first embodiment of a UV detector. A UV detector 1 of the present embodiment includes a silicon substrate 10, a UV ray transmitting part 11, a wavelength conversion part 12, a visible light (VL) receiving part 13, an infrared ray (IR) receiving part 14, an IR transmitting part 15, and a light shielding wall 16.

The silicon substrate 10 is a kind of semiconductor substrate for forming the VL receiving part 13 and the IR receiving part 14, and similar to a general IC or LSI chip, a silicon wafer may be suitably used.

The UV ray transmitting part 11 is configured to transmit ultraviolet ray contained in an incident light L0, and includes a UVB transmission filter 11$x$ and a UVC transmission filter 11$y$ in the present embodiment.

Figure 2:
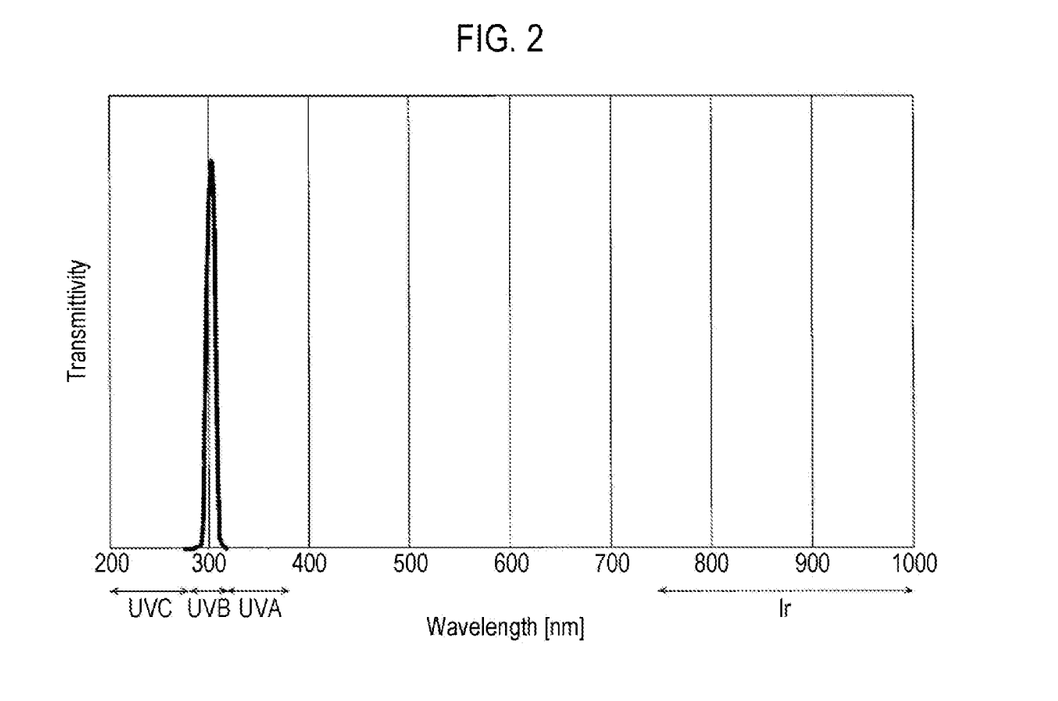
FIG. 2 is a diagram illustrating characteristics of a UVB transmission filter.

FIG. 2 is a diagram illustrating characteristics (wavelength-transmittivity characteristics) of the UVB transmission filter 11$x$. The UVB transmission filter 11$x$ has a steep transmission peak near a wavelength of 300 nm and transmits only ultraviolet ray in a UVB region (which generally indicates a wavelength region of 280 to 315 nm, but in FIG. 2, is limited to a wavelength region narrower than it). Furthermore, the UVB transmission filter 11$x$ hardly transmits light in a VL region (which is generally a wavelength region of 400 to 750 nm). That is, the UVB transmission filter 11$x$ also serves as a VL shielding filter.

Figure 3:
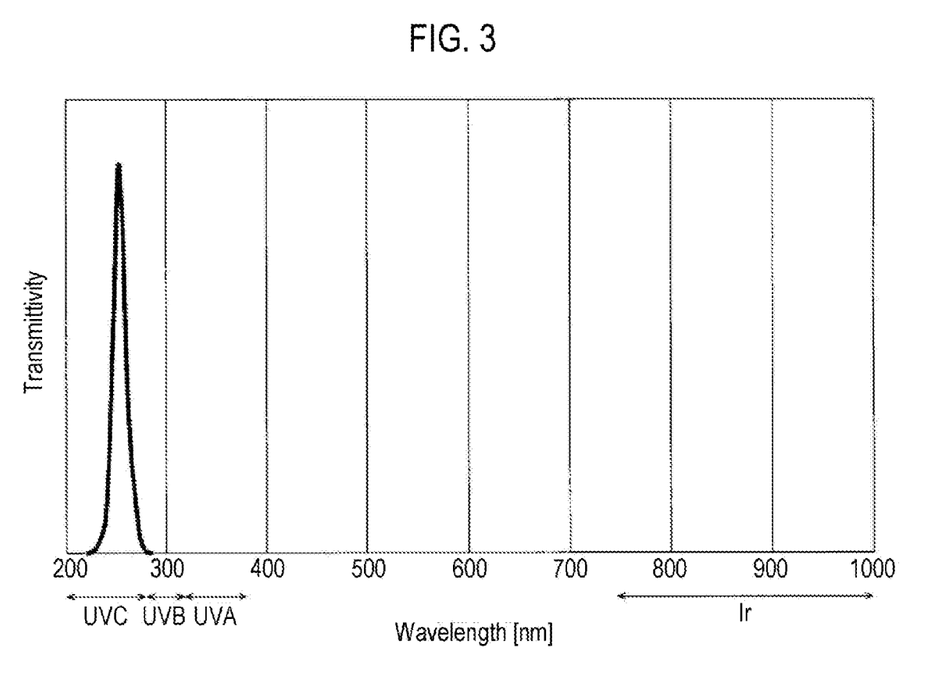
FIG. 3 is a diagram illustrating characteristics of a UVC transmission filter.

FIG. 3 is a diagram illustrating characteristics (wavelength-transmittivity characteristics) of the UVC transmission filter 11$y$. The UVC transmission filter 11$y$ has a steep transmission peak near a wavelength of 260 nm and transmits only ultraviolet ray in a UVC region (which generally covers a wavelength region of less than 280 nm, but in FIG. 2, is limited to a wavelength region narrower than it). Furthermore, the UVC transmission filter 11$y$ hardly transmits light in a VL region. That is, the UVC transmission filter 11$y$ also serves as a VL shielding filter.

Returning to FIG. 1, the description of the components of the UV detector 1 will be continued. The wavelength conversion part 12 is configured to convert the ultraviolet ray transmitted through the UV ray transmitting part 11 into visible light (a wavelength of approximately 380 to 750 nm), and includes a UVB luminescent ink 12$x$ and a UVC luminescent ink 12$y$ in the present embodiment.

The UVB luminescent ink 12$x$ is a kind of fluorescent pigment which emits visible light of wavelength $\lambda x$ by receiving ultraviolet ray in the UVB region, and is applied to an outgoing surface (=output surface of transmitted light) of the UVB transmission filter 11$x$ in the present embodiment. Therefore, the ultraviolet ray in the UVB region transmitted through the UVB transmission filter 11$x$ is converted into visible light L1$x$ of wavelength $\lambda x$ by the UVB luminescent ink 12$x$.

The UVC luminescent ink 12$y$ is a kind of fluorescent pigment which emits visible light of wavelength $\lambda y$ ($\neq \lambda x$) from the ultraviolet ray in the UVC region, and is applied to an outgoing surface (=output surface of the transmitted light) of the UVC transmission filter 11$y$ in the present embodiment. Therefore, the ultraviolet ray in the UVC region transmitted through the UVC transmission filter 11$y$ is converted into visible light L1$y$ of wavelength $2y$ by the UVC luminescent ink 12$y$.

Figure 4:
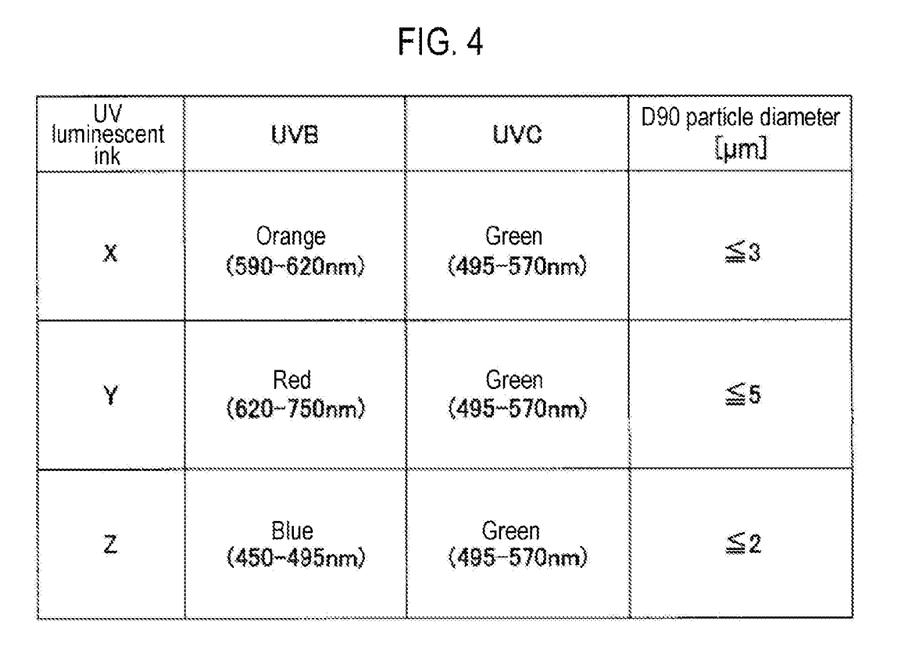
FIG. 4 is a diagram illustrating an example of UV luminescent ink.

FIG. 4 is a diagram illustrating an example of the UV luminescent ink used in the wavelength conversion part 12, in which an emission color when irradiated with the ultraviolet ray in the UVB region, an emission color when irradiated with the ultraviolet ray in the UVC region, and a D90 particle diameter (=particle diameter corresponding to 90% of distribution under integrated sieve) are indicated for each of three types of ultraviolet luminescent inks X to Z.

The UV luminescent ink X emits orange visible light (a wavelength of approximately 590 to 620 nm) when irradiated with the ultraviolet ray in the UVB region, and emits visible light of green (a wavelength of approximately 495 to 570 nm) when irradiated with the ultraviolet ray in the UVC region.

On the other hand, the UV luminescent ink Y emits red visible light (a wavelength of approximately 620 to 750 nm) when irradiated with the ultraviolet ray in the UVB region, and emits visible light of green (approximately a wavelength of 495 to 570 nm) when irradiated with the ultraviolet ray in the UVC region.

In addition, the UV luminescent ink Z emits blue visible light of blue (a wavelength of approximately 450 to 495 nm) when irradiated with the ultraviolet ray in the UVB region, and emits visible light of green (a wavelength of approximately 495 to 570 nm) when irradiated with the ultraviolet ray in the UVC region.

As described above, the UV luminescent ink generally emits visible light of a different wavelength depending on a wavelength of the ultraviolet ray irradiated thereto. Therefore, the same UV luminescent ink may also be used as both the UVB luminescent ink 12$x$ and the UVC luminescent ink 12$y$.

Furthermore, in order to obtain uniform visible lights L1$x$ and L1$y$ in the wavelength conversion part 12, it is preferable to use a UV luminescent ink (e.g., the ultraviolet luminescent ink Z) having a particle diameter as small as possible (about 20 μm) relative to an aperture diameter φ (about 20 μm) of the VL receiving part 13 for the wavelength conversion part 12.

Returning to FIG. 1, the description of the components of the UV detector 1 will be continued. The VL receiving part 13 is configured to detect the visible light obtained by the wavelength conversion part 12, and includes light receiving elements 13$x$ and 13$y$ in the present embodiment.

The light receiving element 13$x$ detects the visible light L1$x$ of wavelength $\lambda x$. On the other hand, the light receiving element 13$y$ detects the visible light L1$y$ of wavelength $\lambda y$. As these light receiving elements 13$x$ and 13$y$, a PN junction type or PIN type Si photodiode formed by adding each of a p-type impurity (such as boron) and an n-type impurity (such as phosphorus) to the silicon substrate 10 may be used.

In addition, the Si photodiode outputs a photocurrent corresponding to the intensity of the incident light. Therefore, it is preferable to install a transimpedance amplifier (current input/voltage output type amplifier) for converting the photocurrent into a voltage signal at a next stage of each of the light receiving elements 13$x$ and 13$y$.

Furthermore, light receiving characteristics of each of the light receiving elements 13$x$ and 13$y$ may be adjusted by any method. For example, it may be adjusted by changing the type and concentration of impurities forming a PN junction surface, or by changing the depth from the surface of the silicon substrate 10 to the PN junction surface. Alternatively, it may be adjusted by installing a color filter on the light receiving surface.

The IR receiving part 14 is configured to detect infrared ray (a wavelength of 750 nm or longer) transmitted through the IR transmitting part 15. As described above, with the configuration including the IR receiving part 14, it is possible to detect both the ultraviolet ray and the infrared ray contained in the incident light L0. In particular, when the UV detector 1 is used as a flame sensor, this infrared ray detection function can be effective (details of which will be described below). In addition, as the light receiving element of the IR receiving part 14, it is preferable to use a Si photodiode as the VL receiving part 13.

Figure 5:
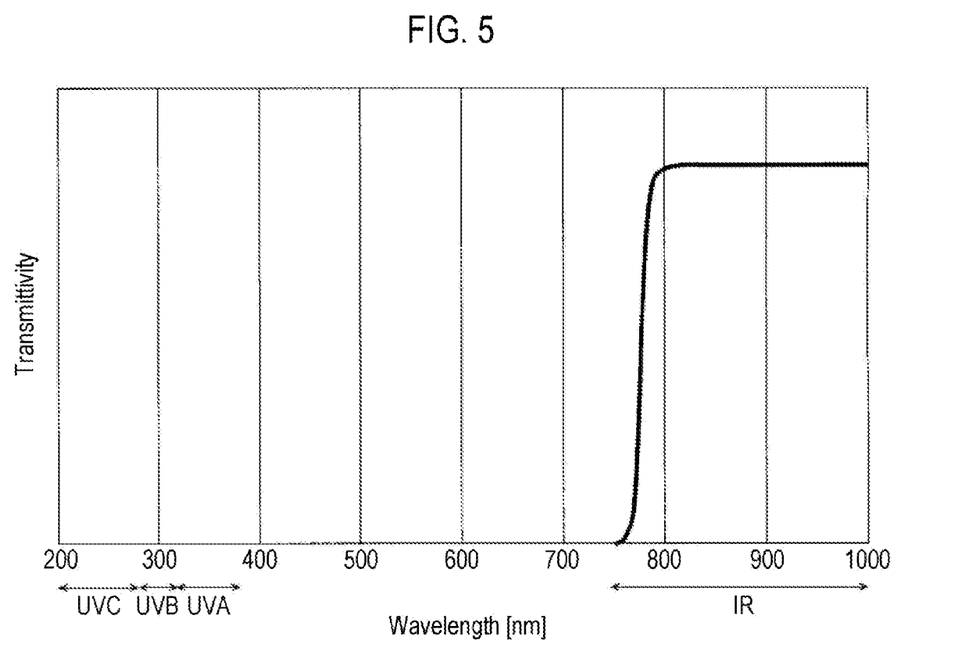
FIG. 5 is a diagram illustrating characteristics of an infrared ray (IR) transmitting part (Ir transmission filter).

The IR transmitting part 15 is configured to transmit the infrared ray contained in the incident light L0. FIG. 5 is a diagram illustrating characteristics (wavelength-transmittivity characteristics) of the IR transmitting part (Ir transmission filter) 15. As illustrated in this drawing, the IR transmitting part 15 transmits only the infrared ray having a wavelength of 750 nm or longer.

The light shielding wall 16 is configured to form a light guide path of each of the VL receiving part 13 (light receiving elements 13x and 13y) and the IR receiving part 14. Furthermore, the light shielding wall 16 may be formed by, for example, diverting a protective layer laminated on the surface of the silicon substrate 10.

As described above, the UV detector 1 according to the present embodiment extracts the ultraviolet ray contained in the incident light L0 by the ultraviolet ray transmitting part 11, and then converts the extracted ultraviolet ray into visible light by the wavelength conversion part 12, and detects it by a VL receiving part 13. With this configuration, it is possible to detect the ultraviolet ray using a more general silicon-based light receiving element (such as a Si photodiode) without using a zinc oxide-based or gallium nitride-based light receiving element having excellent light receiving sensitivity in the UV region.

<UV Detector (Second Embodiment)>

Figure 6:
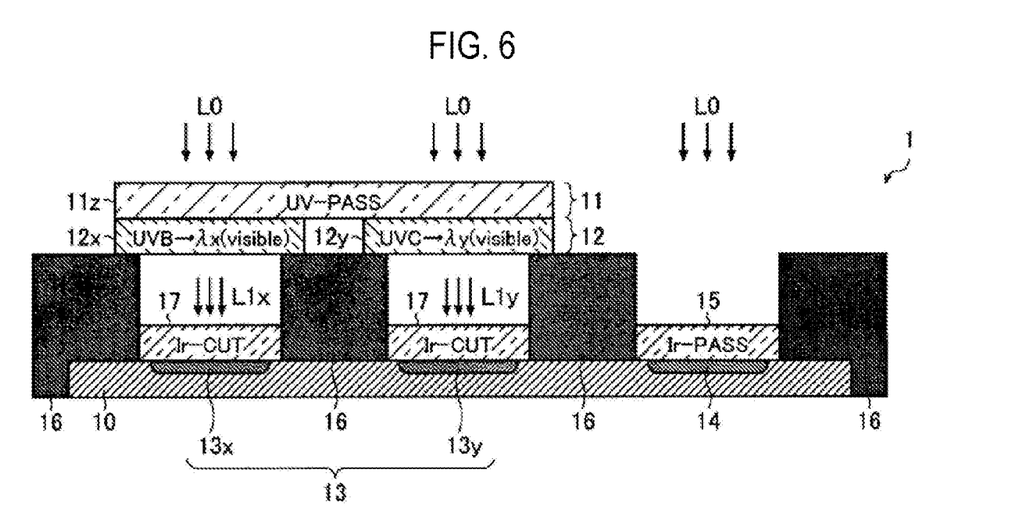
FIG. 6 is a view illustrating a second embodiment of a UV detector.

FIG. 6 is a vertical cross-sectional view schematically illustrating a second embodiment of the UV detector 1. In the UV detector 1 of the second embodiment, a UV transmission filter 11z is used instead of the UVB transmission filter 11x and the UVC transmission filter 11y described above.

Figure 7:
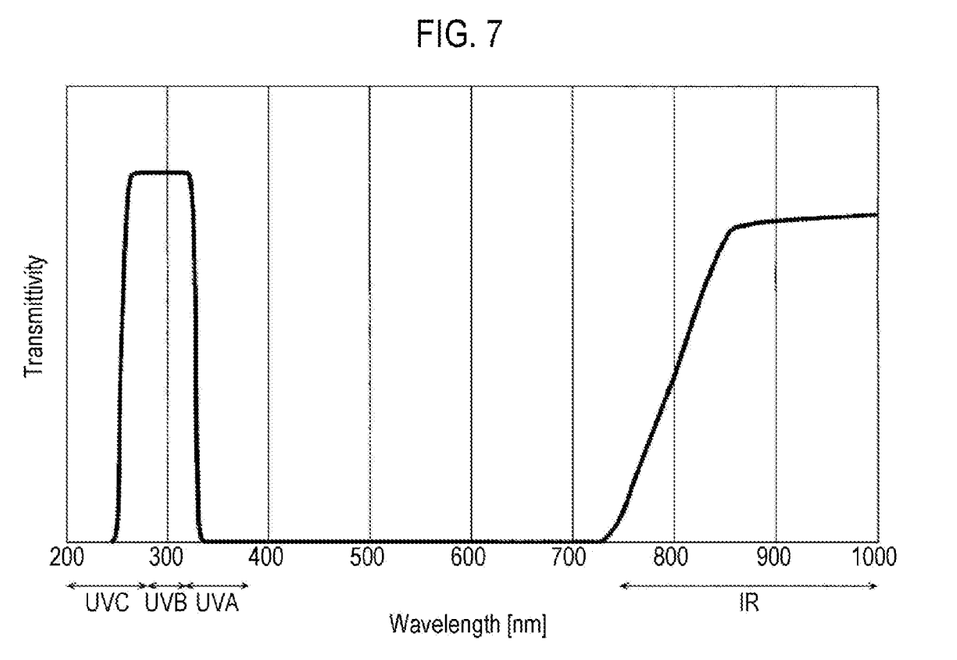
FIG. 7 is a diagram illustrating characteristics of a UV transmission filter.

FIG. 7 is a diagram illustrating characteristics (wavelength-transmittivity characteristics) of the UV transmission filter 11z. The UV transmission filter 11z has a broad transmission peak over a wavelength of approximately 250 to 330 nm, and transmits ultraviolet ray in a wavelength region over both the UVB region and the UVC region. Furthermore, the UV transmission filter 11z hardly transmits light in the VL region. That is, the UV transmission filter 11z also serves as a VL shielding filter.

Returning to FIG. 6, the description of the components of the UV detector 1 will be continued. The UVB luminescent ink 12x and the UVC luminescent ink 12y are each applied to an outgoing surface (=output surface of the transmitted light) of the UV transmission filter 11z. Therefore, the ultraviolet ray in the UVB region transmitted through the UV transmission filter 11z is converted into visible light L1x of wavelength λx by the UVB luminescent ink 12x. Furthermore, the ultraviolet ray in the UVC region transmitted through the UV transmission filter 11z is converted into visible light L1y of wavelength 2y by the UVC luminescent ink 12y.

However, the UV transmission filter 11z may have a transmission band not only in the UV region (a wavelength of approximately 250 to 330 nm) but also in the IR region (a wavelength of approximately 750 nm or longer) as illustrated in the FIG. 7.

In this case, it is preferable to install an IR shielding part 17 for shielding the infrared ray between the wavelength conversion part 12 and the VL receiving part 13. Furthermore, the IR shielding part 17 may be formed, for example, directly above each of the light receiving elements 13x and 13y.

Figure 8:
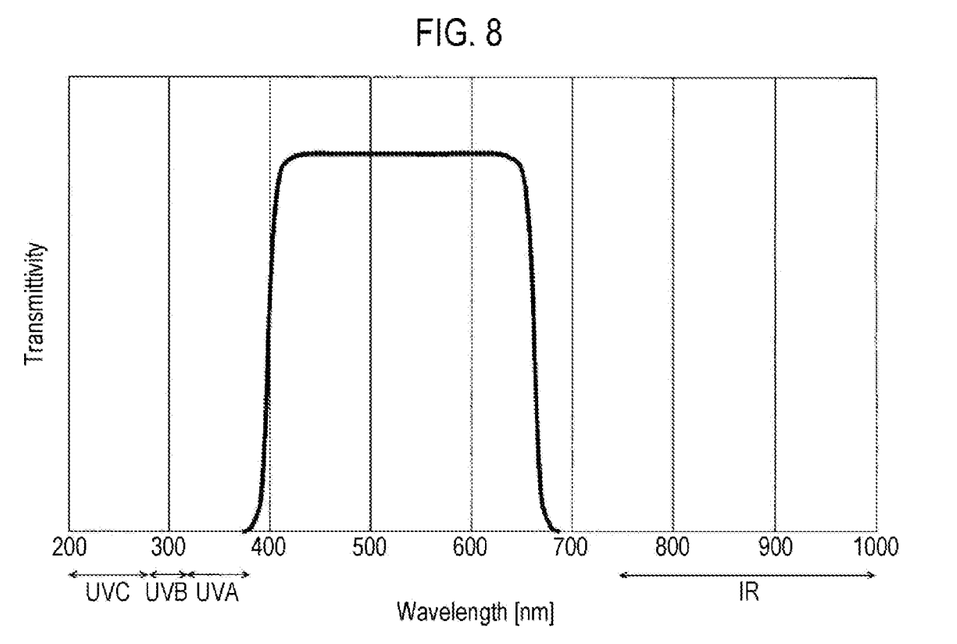
FIG. 8 is a diagram illustrating characteristics of an IR shielding part (Ir shielding filter).

FIG. 8 is a diagram illustrating characteristics (wavelength-transmittivity characteristics) of the IR shielding part (Ir shielding filter) 17. The IR shielding part 17 has a broad transmission peak over a wavelength of approximately 390 to 680 nm, shields the ultraviolet ray and the infrared ray, and transmits the visible light. That is, the IR shielding part 17 may also be understood as a VL transmitting part.

Of course, when the UV transmission filter 11z has a transmission band only in the UV region, the IR shielding part 17 may also be omitted as the first embodiment (FIG. 1).

As described above, in the case of the UV detector 1 of the present embodiment, since the single UV transmission filter 11z can be used as the UV ray transmitting part 11, the device structure is more simplified.

<Packaging>

Figure 9:
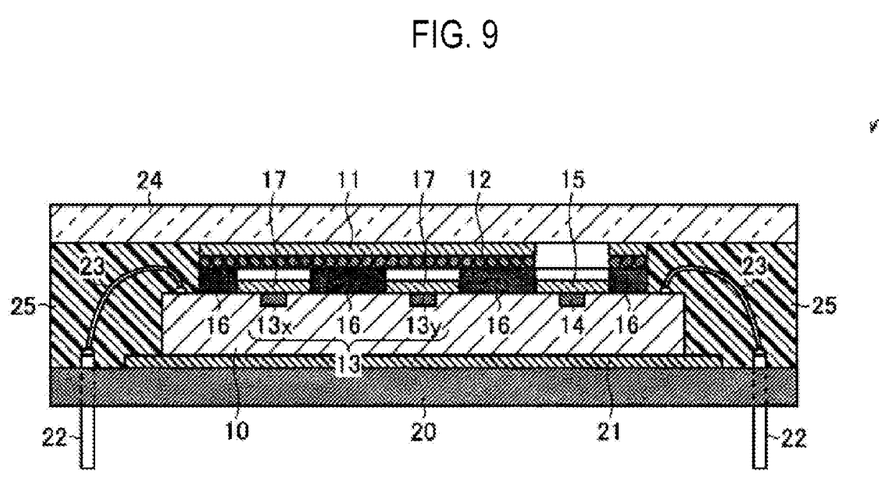
FIG. 9 is a view illustrating an example of packaging of the UV detector.

FIG. 9 is a vertical cross-sectional view schematically illustrating an example of packaging of the UV detector 1. The components described above are denoted by the same reference numerals as those of the second embodiment (FIG. 6), and therefore, overlapping descriptions will be omitted, and new components will be mainly described below.

The silicon substrate 10 is die-bonded to a frame 21 formed over a surface (upper surface) of a package substrate 20.

Lead pins 22 formed by penetrating from the surface (upper surface) to a rear surface (lower surface) of the package substrate 20 are connected to pads (not shown) of the silicon substrate 10 via wires 23.

A light transmitting plate 24 made of glass or resin is attached to the surface side (upper surface side) of the silicon substrate 10 so as to close an opening surface of each of the VL receiving part 13 and the IR receiving part 14.

A UV ray transmitting part (UV transmission filter) 11 is formed over a rear surface (lower surface) of the light transmitting plate 24 except for a region facing the opening of the IR receiving part 14.

A UV luminescent ink (fluorescent pigment) which emits visible light of a different wavelength corresponding to a wavelength of ultraviolet ray to be irradiated, as the wavelength conversion part 12, is applied to the outgoing surface (output surface) of the UV ray transmitting part 11.

A sealing material 25 made of resin is filled between the package substrate 20 and the light transmitting plate 24.

In this manner, the UV detector 1 can be mass-produced with a packaging structure substantially similar to a general light receiving device.

<Fire Alarm>

The UV detector 1 described so far may be suitably used as a flame sensor of a fire alarm. Hereinafter, this will be specifically described with reference to the drawings.

Figure 10:
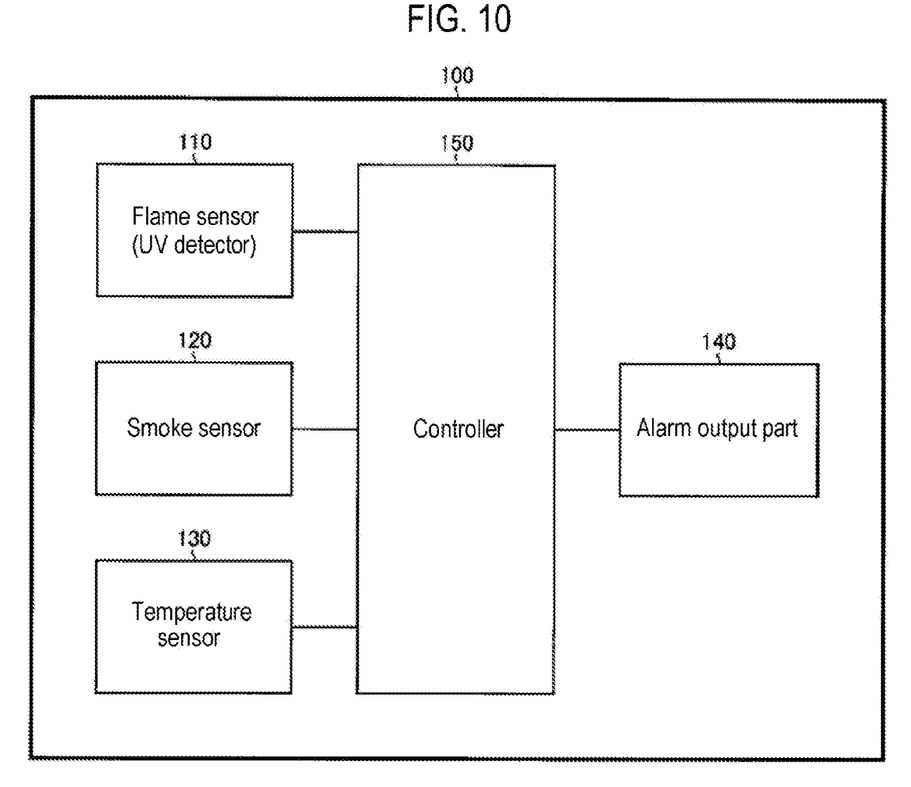
FIG. 10 is a diagram illustrating a configuration example of a fire alarm.

FIG. 10 is a diagram illustrating a configuration example of a fire alarm. A fire alarm 100 of this configuration example includes a flame sensor 110, a smoke sensor 120, a temperature sensor 130, an alarm output part 140, and a controller 150.

The flame sensor 110 detects a flame generated by a fire and notifies the controller 150 of it.

The smoke sensor 120 detects smoke generated by the fire and notifies the controller 150 of it.

The temperature sensor 130 detects a temperature rise caused by the fire and notifies the controller 150 of it.

The alarm output part 140 outputs an alarm when a fire occurs. In addition, there may be a voice, a buzzer sound, a bell sound, a warning light, and the like as alarms in the narrow sense in order to notify the surrounding people of occurrence of a fire. Furthermore, there may be various control signals for automatically closing fire protection and smoke shutters or doors, or for automatically driving fire extinguishing equipment such as a sprinkler or the like, fire notification signals for a fire station or fire prevention manager, and the like as alarms in the broad sense.

The controller 150 drives the alarm output part 140 when occurrence of a fire is detected according to detection results of the flame sensor 110, the smoke sensor 120, and the temperature sensor 130.

Figure 11:
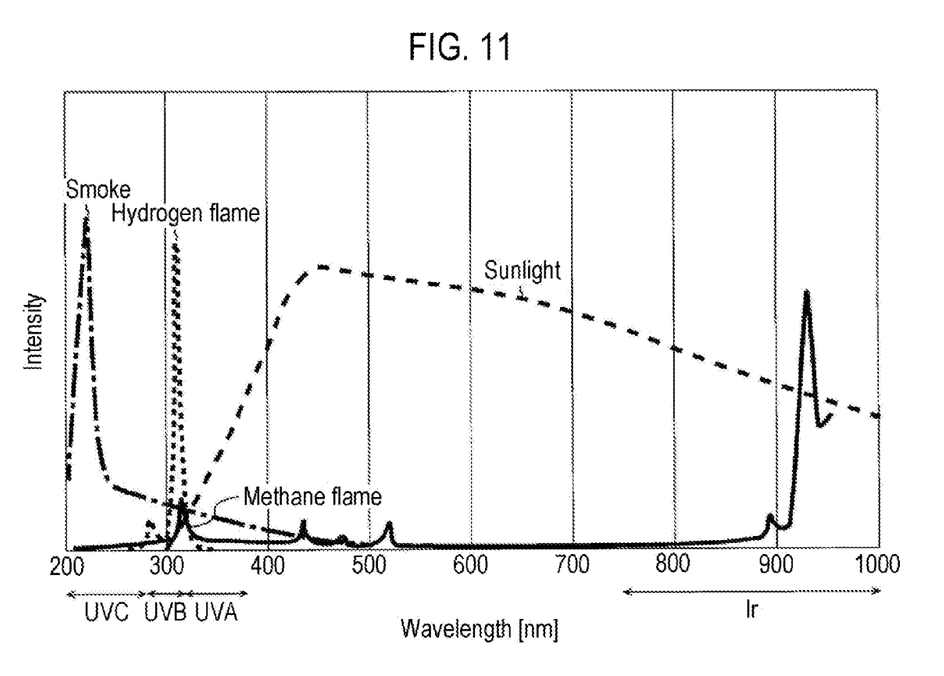
FIG. 11 is a diagram illustrating an example of a flame spectrum.

FIG. 11 is a view illustrating an example (solid line: methane flame, small broken line: hydrogen flame, dashed dotted line: spark, large broken line: sunlight) of a flame spectrum.

For example, the flame at the time of methane combustion emits light mainly in the UVB region and the IR region. Furthermore, the flame at the time of hydrogen combustion emits light mainly in the UVB region and the UVC region. Similarly, the spark emits light mainly in the UVB region and the UVC region.

As can be seen from the flame spectrum described above, the UV detector 1 that can detect ultraviolet ray in both the UVB region and the UVC region may be suitably used as the flame sensor 110 of the fire alarm 100.

In addition, since the UV detector 1 can detect not only ultraviolet ray but also infrared ray, it is possible to more precisely detect, for example, occurrence of a flame at the time of methane combustion.

Moreover, the UV detector 1 can also calculate respective irradiances (or values proportional to the irradiances) of the ultraviolet ray in both the UVB region and the UVC region, and determine a type of flame from respective intensities and ratios. For example, if the irradiance in the UVB region is equal to or higher than a reference value and the irradiance in the UVB region is equal to or higher than five times the irradiance in the UVC region, the cause of this flame is determined to be, for example, electrical leakage. If the irradiance in the UVC region is equal to or higher than the reference value and the irradiance in the UVC region is equal to or higher than five times the irradiance in the UVB region, the cause of this flame is determined to be, for example, hydrogen leakage.

<Other Modifications>

Furthermore, various technical features disclosed herein may be modified in addition to the aforementioned embodiment, without departing from the spirit of the present disclosure. That is, the aforementioned embodiment is not restrictive but should be considered to be illustrative in all aspects, and the technical scope of the present disclosure is not limited to the aforementioned embodiment but should be understood to include the meaning equivalent to the scope of claims and all modifications that fall within the scope.

The present disclosure disclosed herein can be used in, for example, a fire alarm or industrial equipment.

According to the present disclosure in some embodiments, it is possible to provide a UV detector capable of using a silicon-based light receiving element.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. An ultraviolet detector, comprising:
an ultraviolet ray transmitting part configured to transmit a first ultraviolet ray and a second ultraviolet ray contained in incident light, the first ultraviolet ray being in a UVB region and the second ultraviolet ray being in a UVC region;
a wavelength conversion part configured to convert the first ultraviolet ray in the UVB region into visible light of a first wavelength, and configured to convert the second ultraviolet ray in the UVC region into visible light of a second wavelength that is different from the first wavelength; and
a visible light receiving part comprising:
a first light receiving element configured to detect selectively the visible light of the first wavelength; and
a second light receiving element configured to detect selectively the visible light of the second wavelength.

2. The ultraviolet detector of claim 1, wherein the visible light receiving part includes a silicon-based light receiving element.

3. The ultraviolet detector of claim 1, further comprising a light shielding wall forming a light guide path of each of the first light receiving element and the second light receiving element.

4. The ultraviolet detector of claim 1, wherein the ultraviolet ray transmitting part includes:
a UVB transmission filter configured to transmit the first ultraviolet ray in the UVB region; and
a UVC transmission filter configured to transmit the second ultraviolet ray in the UVC region.

5. The ultraviolet detector of claim 1, wherein the wavelength conversion part includes a fluorescent pigment for emitting the visible light by receiving the first ultraviolet ray and the second ultraviolet ray.

6. The ultraviolet detector of claim 1, further comprising an infrared shielding part configured to shield infrared ray between the wavelength conversion part and the visible light receiving part.

7. The ultraviolet detector of claim 1, further comprising:
an infrared ray transmitting part configured to transmit infrared ray contained in the incident light; and
an infrared ray receiving part configured to detect the infrared ray transmitted through the infrared ray transmitting part.

8. A fire alarm, comprising:
a flame sensor configured to detect ultraviolet ray emitted by a flame using the ultraviolet detector of claim 1;
an alarm output part configured to output an alarm; and
a controller configured to drive the alarm output part according to a detection result of the flame sensor.

9. The fire alarm of claim 8, wherein the ultraviolet detector is configured to calculate values corresponding to respective irradiances of ultraviolet ray of both UVB region and UVC region, and to determine a type of the flame from respective intensities and ratios of the ultraviolet ray.

* * * * *